United States Patent
Yu et al.

(10) Patent No.: US 12,398,750 B2
(45) Date of Patent: Aug. 26, 2025

(54) FOLDING MECHANISM AND FOLDING ELECTRONIC DEVICE

(71) Applicant: VIVO MOBILE COMMUNICATION CO., LTD., Guangdong (CN)

(72) Inventors: Shuitong Yu, Guangdong (CN); Xingliang Qi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 252 days.

(21) Appl. No.: 18/326,324

(22) Filed: May 31, 2023

(65) Prior Publication Data

US 2023/0304530 A1    Sep. 28, 2023

Related U.S. Application Data

(63) Continuation of application No. PCT/CN2021/142603, filed on Dec. 29, 2021.

(30) Foreign Application Priority Data

Dec. 30, 2020    (CN) .......................... 202011616737.8

(51) Int. Cl.
*G06F 1/16*        (2006.01)
*F16C 11/10*    (2006.01)
(Continued)

(52) U.S. Cl.
CPC ............ F16C 11/103 (2013.01); G09F 9/301 (2013.01); H04M 1/0268 (2013.01)

(58) Field of Classification Search
CPC ........ F16C 11/103; F16C 11/04; G09F 9/301; G09F 9/30; H04M 1/0268; H04M 1/022; H04M 1/0214; H05K 5/0226
See application file for complete search history.

(56) References Cited

U.S. PATENT DOCUMENTS 8,578,561 B2 *    11/2013    Chuang ................. G06F 1/1681
                                                                                16/354
9,848,502 B1 *    12/2017    Chu ....................... G06F 1/1681
(Continued)

FOREIGN PATENT DOCUMENTS

CN        201420801 Y        3/2010
CN        206918043 U        1/2018
(Continued)

*Primary Examiner* — Rockshana D Chowdhury
(74) *Attorney, Agent, or Firm* — Price Heneveld LLP (57) ABSTRACT

A folding mechanism is disclosed. A first connecting portion is connected to a first rotating shaft, a second connecting portion is connected to a second rotating shaft, the first and second rotating shaft are rotatably connected to a first elastic connector, a first gear is mounted on the first rotating shaft, a second gear is mounted on the second rotating shaft and meshed with the first gear, the first gear has a first distal edge and a first proximal edge, the second gear has a second distal edge and a second proximal edge, the first elastic connector is elongated or shortened with meshed rotation of the first gear and the second gear, and the folding mechanism has a first state in which the first distal edge is meshed with the second distal edge, and a second state in which the first proximal edge is meshed with the second proximal edge.

17 Claims, 5 Drawing Sheets

(51) Int. Cl.
*G09F 9/30* (2006.01)
*H04M 1/00* (2006.01)
*H04M 1/02* (2006.01)

(56) References Cited

U.S. PATENT DOCUMENTS

| | | | | |
|---|---|---|---|---|
| 10,824,197 | B1* | 11/2020 | Hsu | G06F 1/1641 |
| 11,231,752 | B2* | 1/2022 | Liu | H04M 1/0216 |
| 11,579,662 | B2* | 2/2023 | Hsu | H04M 1/022 |
| 11,598,365 | B2* | 3/2023 | Lin | F16C 11/04 |
| 11,611,641 | B2* | 3/2023 | Cha | H04M 1/022 |
| 11,630,491 | B2* | 4/2023 | Huang | G06F 1/1616 |
| | | | | 361/679.01 |
| 11,698,665 | B2* | 7/2023 | Hsu | F16C 11/04 |
| | | | | 16/233 |
| 11,778,764 | B2* | 10/2023 | Zhang | H04M 1/022 |
| | | | | 361/807 |
| 11,800,669 | B2* | 10/2023 | Lin | H05K 5/0226 |
| 11,809,239 | B2* | 11/2023 | Hwang | F16C 11/04 |
| 11,834,880 | B2* | 12/2023 | Peng | E05D 11/082 |
| 11,846,998 | B2* | 12/2023 | Wu | H05K 5/0226 |
| 11,886,254 | B2* | 1/2024 | Kim | G06F 1/1641 |
| 11,924,987 | B2* | 3/2024 | Lee | H04M 1/022 |
| 11,983,047 | B2* | 5/2024 | Park | G06F 1/1624 |
| 12,028,470 | B2* | 7/2024 | Wang | H04M 1/0268 |
| 12,032,417 | B2* | 7/2024 | Park | H04M 1/022 |
| 12,063,319 | B2* | 8/2024 | Wu | H04M 1/022 |
| 2015/0241925 | A1 | 8/2015 | Seo et al. | |
| 2018/0309861 | A1 | 10/2018 | Lin et al. | |
| 2019/0163241 | A1* | 5/2019 | Moon | G06F 1/1641 |
| 2019/0274227 | A1* | 9/2019 | Hsu | H05K 5/0226 |
| 2020/0081501 | A1* | 3/2020 | Lin | E05D 11/082 |
| 2020/0329573 | A1 | 10/2020 | Huang et al. | |
| 2021/0096596 | A1 | 4/2021 | Cheng | |
| 2021/0096608 | A1* | 4/2021 | Hallar | E05D 11/1028 |
| 2021/0263565 | A1* | 8/2021 | Yen | G06F 1/1681 |
| 2021/0286413 | A1 | 9/2021 | Chen et al. | |
| 2022/0007528 | A1* | 1/2022 | Kim | G06F 1/1681 |
| 2022/0113771 | A1 | 4/2022 | Wu et al. | |
| 2024/0084845 | A1* | 3/2024 | Hsu | F16C 11/04 |

FOREIGN PATENT DOCUMENTS

| | | |
|---|---|---|
| CN | 108874048 A | 11/2018 |
| CN | 208538027 U | 2/2019 |
| CN | 109654112 A | 4/2019 |
| CN | 110324441 A | 10/2019 |
| CN | 209641241 U | 11/2019 |
| CN | 209881842 U | 12/2019 |
| CN | 210351882 U | 4/2020 |
| CN | 210640916 U | 5/2020 |
| CN | 212034155 U | 11/2020 |
| CN | 112738308 A | 4/2021 |
| WO | 2020010987 A1 | 1/2020 |
| WO | 2020248746 A1 | 12/2020 |
| WO | 2020259526 A1 | 12/2020 |

* cited by examiner

FOLDING MECHANISM AND FOLDING ELECTRONIC DEVICE

CROSS-REFERENCE TO RELATED APPLICATIONS

This application is a continuation application of PCT International Application No. PCT/CN2021/142603 filed on Dec. 29, 2021, which claims priority to Chinese Patent Application No. 202011616737.8, entitled "FOLDING MECHANISM AND FOLDING ELECTRONIC DEVICE" and filed with the China National Intellectual Property Administration on Dec. 30, 2020, which are incorporated herein by reference in their entireties.

TECHNICAL FIELD

This application relates to the technical field of communication devices, and in particular, to a folding mechanism and a folding electronic device.

BACKGROUND

With the development of technology, the development of electronic devices is increasingly rapid, and requirements of users for electronic devices are increasingly high. At present, a flexible screen is also widely applied to electronic devices, to form folding electronic devices.

The folding electronic devices often have folding problems during folding. For example, when a folding electronic device is folded in, because a bending radius at a hinge is small, it is likely to cause crease or damage to the flexible screen by excessive extrusion. When the folding electronic device is folded out, because the bending radius at the hinge is excessive, it is likely to cause over pulling and deformation of the flexible screen, or even cause breaking of the flexible screen. It can be learned that, at present, the folding electronic device has a problem that the flexible screen is easily damaged during folding, finally resulting in a short service life of the flexible screen.

SUMMARY

According to a first aspect, an embodiment of this application discloses a folding mechanism, applied to a folding electronic device, including a first rotating shaft, a second rotating shaft, a first gear, a second gear, a first connecting portion, a second connecting portion, and a first elastic connector, where the first connecting portion is connected to the first rotating shaft, the second connecting portion is connected to the second rotating shaft, both the first rotating shaft and the second rotating shaft are rotatably connected to the first elastic connector, the first gear is mounted on the first rotating shaft, the second gear is mounted on the second rotating shaft, the first gear is meshed with the second gear, the first gear has a first distal edge and a first proximal edge, the second gear has a second distal edge and a second proximal edge, the first elastic connector is elongated or shortened with meshed rotation of the first gear and the second gear, and the folding mechanism has a first state in which the first distal edge is meshed with the second distal edge, and a second state in which the first proximal edge is meshed with the second proximal edge.

According to a second aspect, an embodiment of this application discloses a folding electronic device, including a flexible screen, a first housing, a second housing, and the folding mechanism described above, where the first housing is connected to the first connecting portion and is rotatable with the first connecting portion, and the second housing is connected to the second connecting portion and is rotatable with the second connecting portion;

the flexible screen includes a first region, a second region, and a joint region, the first region is connected to the second region through the joint region, the first region is connected to the first housing, and the second region is connected to the second housing;

in a case that the first housing rotates relative to the second housing to a folded state of the electronic device, and the flexible screen is located between the first housing and the second housing, the first distal edge is meshed with the second distal edge; and in a case that the first housing rotates relative to the second housing to the folded state of the electronic device, and the first region and the second region are located on two opposite sides of the first housing and the second housing, the first proximal edge is meshed with the second proximal edge.

BRIEF DESCRIPTION OF THE DRAWINGS

FIG. 1 is a schematic structural diagram of a partial structure of an electronic device disclosed in an embodiment of this application when folded in;

FIG. 9 is a schematic structural diagram of a partial structure of an electronic device disclosed in an embodiment of this application when folded in;

LIST OF REFERENCE NUMERALS

100—First rotating shaft, 110—First occlusion structure, 111—First occlusal teeth, 120—Sleeve,
200—Second rotating shaft, 210—Second occlusion structure, 220—Sliding rod,
300—First gear, 310—Second occlusal teeth, 311—Fourth occlusal teeth,
400—Second gear, 410—Third occlusal teeth,
500—First connecting portion, 510—First limiting surface, 530—First notch, 600—Second connecting portion, 610—Second limiting surface, 630—Second notch,
700—First elastic connector,
800—First elastic mechanism,
900—Second elastic mechanism,
1000—Second elastic connector,
1100—Flexible screen.

DETAILED DESCRIPTION

The following clearly describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguished by "first", "second", and the like are usually one type, and the number of objects is not limited. For example, the first object may be one or more than one. In addition, in the specification and the claims, "and/or" represents at least one of the connected objects, and the character "I" generally represents an "or" relationship between the associated objects.

An electronic device provided in the embodiments of this application are described below through specific embodiments and application scenarios thereof with reference to the accompanying drawings.

Figure 1:
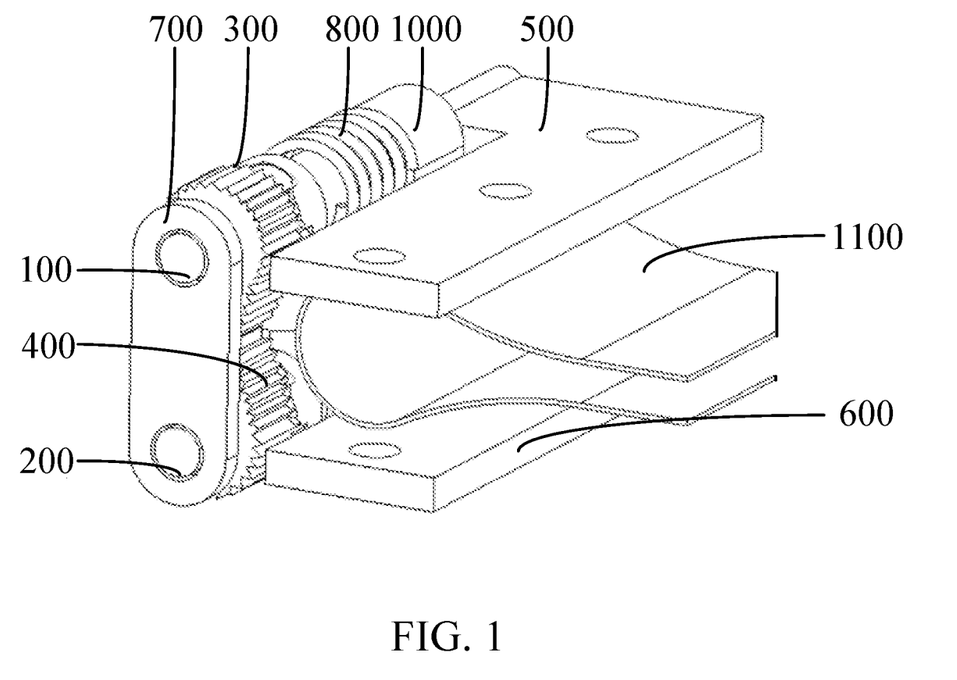
Figure 2:
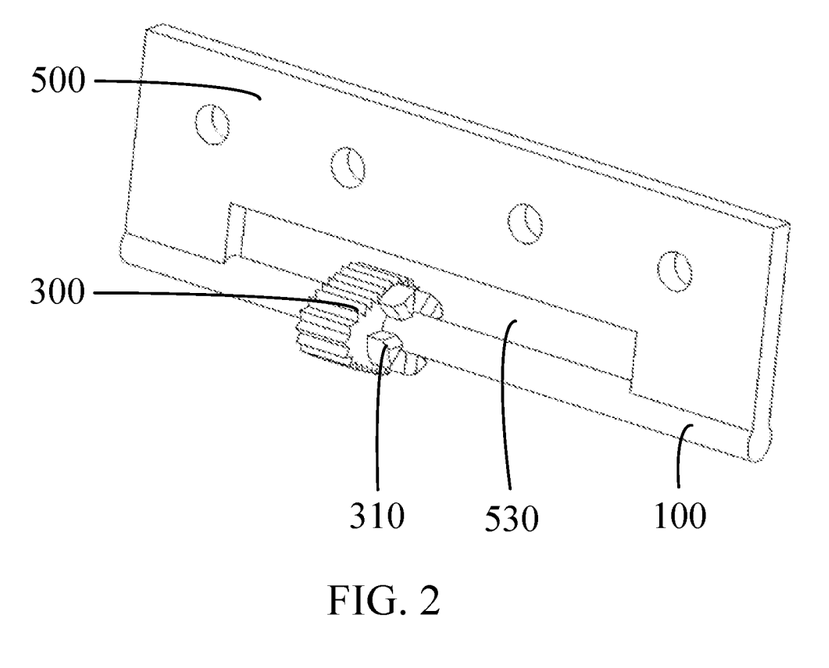
FIG. 2 and FIG. 3 are schematic structural diagrams of different parts of an electronic device disclosed in an embodiment of this application.
Figure 3:
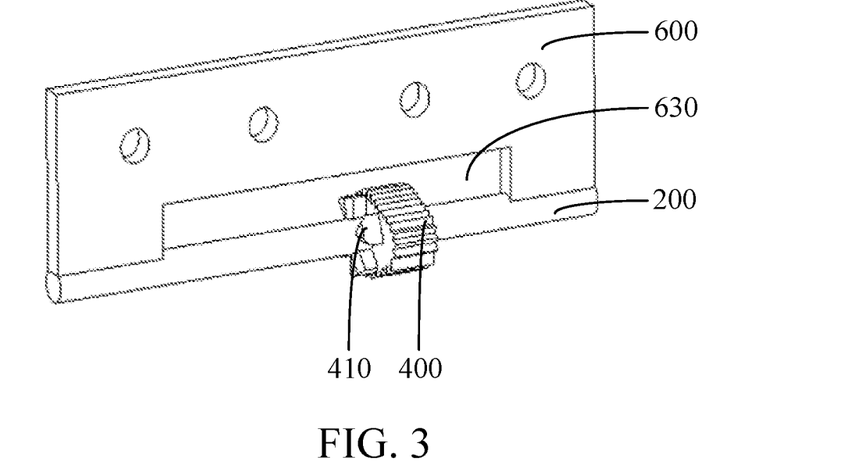
Figure 4:
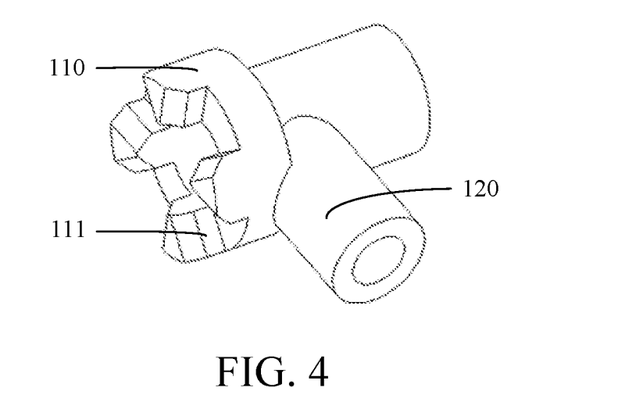
FIG. 4 is a schematic structural diagram of a first occlusion structure of an electronic device disclosed in an embodiment of this application.
Figure 5:
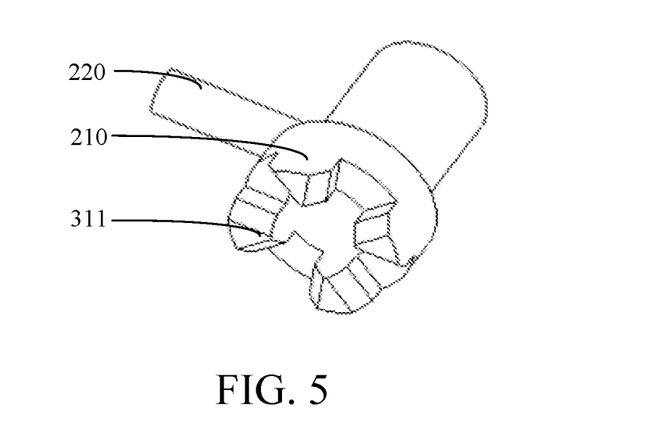
FIG. 5 is a schematic structural diagram of a second occlusion structure of an electronic device disclosed in an embodiment of this application.
Figure 6:
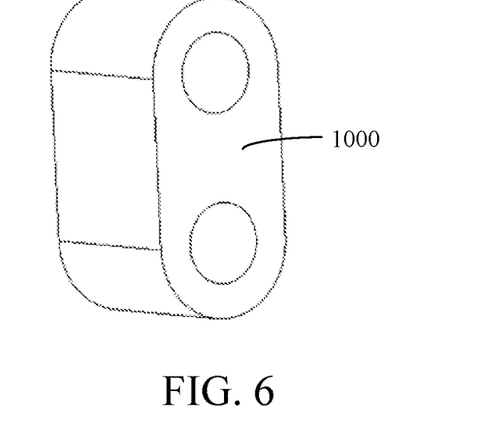
FIG. 6 is a schematic structural diagram of a second elastic connector of an electronic device disclosed in an embodiment of this application.
Figure 7:
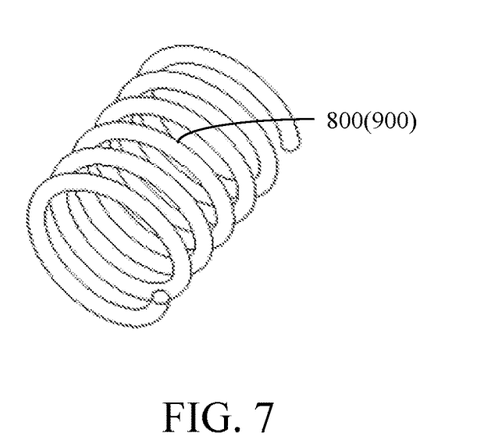
FIG. 7 is a schematic structural diagram of a first elastic mechanism or a second elastic mechanism of an electronic device disclosed in an embodiment of this application.
Figure 8:
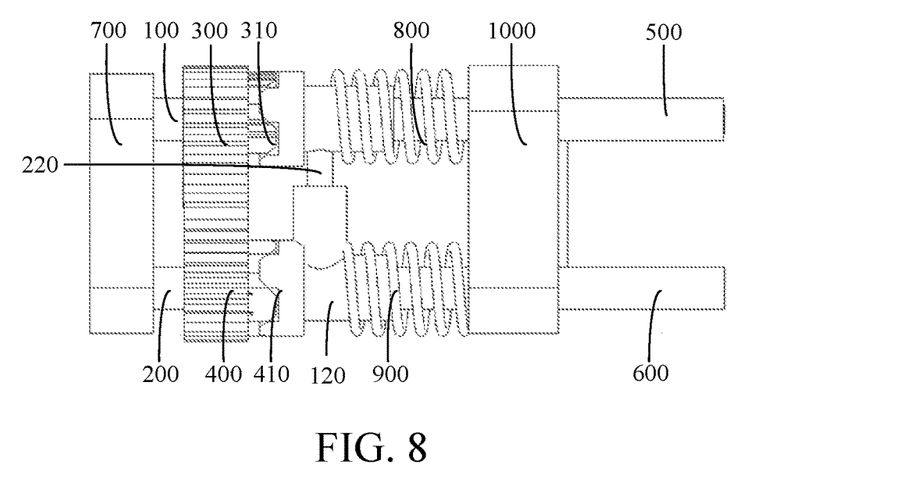
FIG. 8 is a schematic diagram of a partial structure of an electronic device disclosed in an embodiment of this application.
Figure 9:
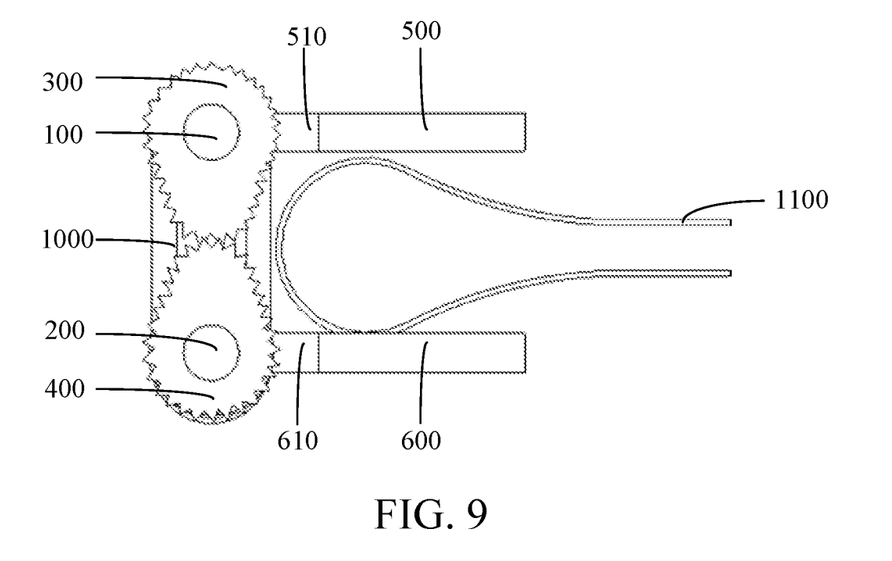
Figure 10:
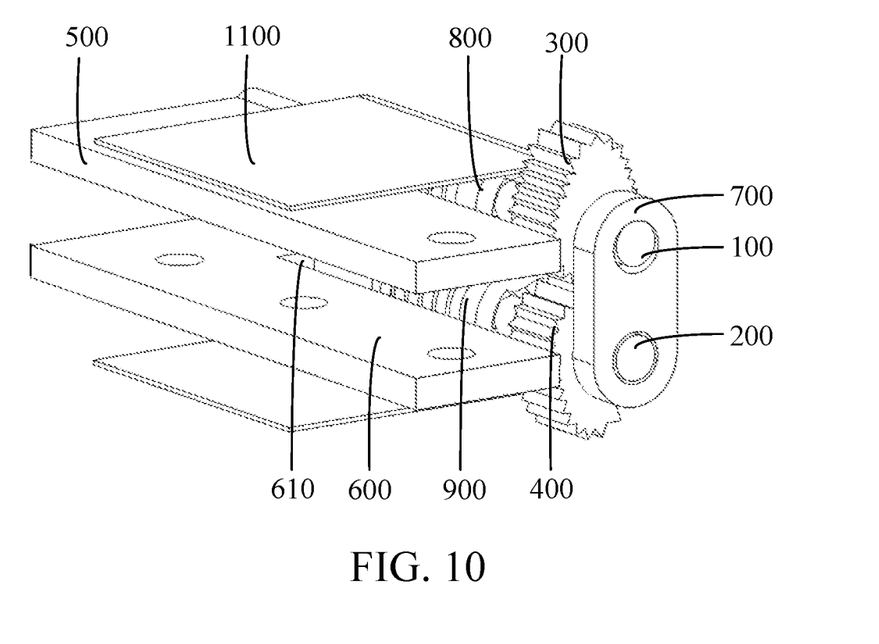
FIG. 10 is a schematic structural diagram of a partial structure of an electronic device disclosed in an embodiment of this application when folded out.
Figure 11:
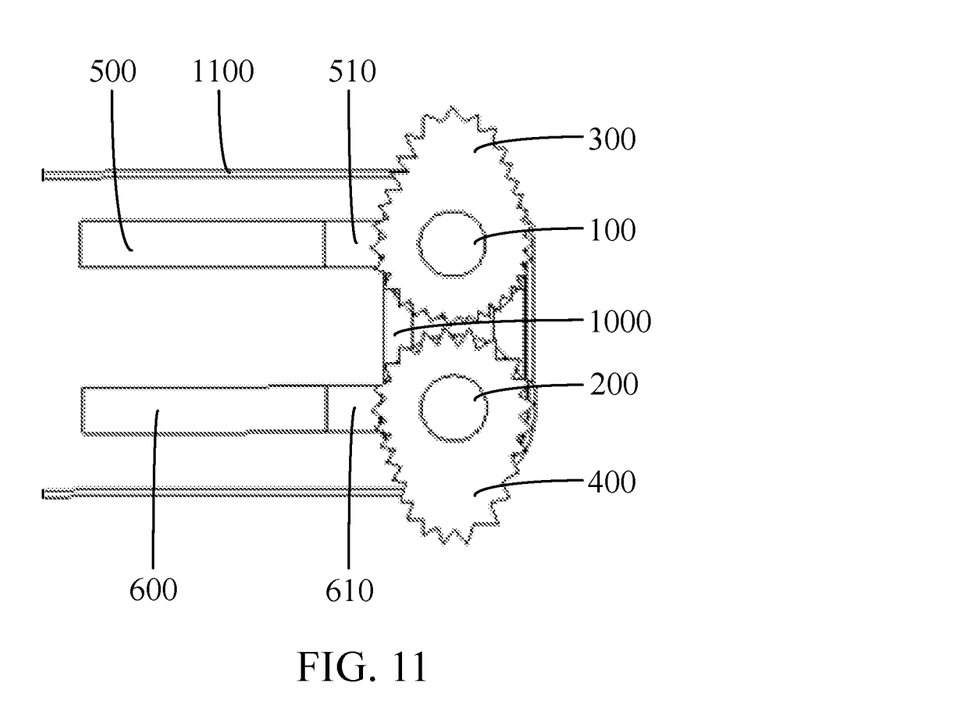
FIG. 11 is a schematic structural diagram of a partial structure of an electronic device disclosed in an embodiment of this application when folded out.

As shown in FIG. 1 to FIG. 11, an embodiment of this application discloses a folding mechanism, applied to a folding electronic device. The disclosed folding mechanism includes a first rotating shaft 100, a second rotating shaft 200, a first gear 300, a second gear 400, a first connecting portion 500, a second connecting portion 600, and a first elastic connector 700.

The first elastic connector 700 is a mounting base of the first rotating shaft 100 and the second rotating shaft 200. Both the first rotating shaft 100 and the second rotating shaft 200 are rotatably connected to the first elastic connector 700. The first elastic connector 700 may be a rubber tube, a silica sleeve, or the like. A specific type of the first elastic connector 700 is not limited in the embodiments of this application.

Both the first rotating shaft 100 and the second rotating shaft 200 are rotatable about an axis of the first rotating shaft 100 and an axis of the second rotating shaft 200. Optionally, a user may manually control the first rotating shaft 100 and the second rotating shaft 200 to rotate in a direction required by the user, to unfold or fold the folding electronic device.

The first gear 300 is mounted on the first rotating shaft 100, and during rotation of the first rotating shaft 100, the first gear 300 rotates with the first rotating shaft 100. The second gear 400 is mounted on the second rotating shaft 200, and during rotation of the second rotating shaft 200, the second gear 400 rotates with the second rotating shaft 200. Optionally, the first gear 300 and the first rotating shaft 100 may be an integrated structure, and the second gear 400 and the second rotating shaft 200 may be an integrated structure.

Certainly, the first gear 300 may be fixed to the first rotating shaft 100 in a key connection manner and the second gear 400 may be fixed to the second rotating shaft 200 in the key connection manner. Specific assembling manners between the first gear 300 and the first rotating shaft 100 and between the second gear 400 and the second rotating shaft 200 are not limited in the embodiments of this application.

The first gear 300 is meshed with the second gear 400 to ensure that the first rotating shaft 100 and the second rotating shaft 200 rotate synchronously. The first gear 300 has a first distal edge and a first proximal edge, and the second gear 400 has a second distal edge and a second proximal edge. The first distal edge of the first gear 300 is farthest from a rotation center of the first gear 300, and the first proximal edge is closest to the rotation center of the first gear 300. Similarly, the second distal edge of the second gear 400 is farthest from a rotation center of the second gear 400, and the second proximal edge of the second gear 400 is closest to the rotation center of the second gear 400.

The first connecting portion 500 is connected to the first rotating shaft 100, and the second connecting portion 600 is connected to the second rotating shaft 200. The first connecting portion 500 is rotatable with the first rotating shaft 100, and the second connecting portion 600 is rotatable with the second rotating shaft 200. In a feasible operation mode, the user can manually rotate the first connecting portion 500 and the second connecting portion 600, to implement rotation of the first rotating shaft 100 and the second rotating shaft 200 relative to the first elastic connector 700, thereby implementing meshed rotation of the first gear 300 and the second gear 400.

The folding mechanism has a first state and a second state. In the first state, the first distal edge is meshed with the second distal edge, an axis center distance between the first rotating shaft 100 and the second rotating shaft 200 increases, the first elastic connector 700 is stretched, a bending radius increases, and the folding electronic device is finally in a folded state (a first folded state) with the increase of the axis center distance between the first rotating shaft 100 and the second rotating shaft 200. In this case, the folding electronic device can be folded in, thereby avoiding crease or damage caused by excessive extrusion of the folding electronic device. In the second state, the first proximal edge is meshed with the second proximal edge, the axis center distance between the first rotating shaft 100 and the second rotating shaft 200 decreases, the first elastic connector 700 is squeezed, and the bending radius decreases. In this case, the folding electronic device may be folded out, so that the folding electronic device is finally in a folded state (a second folded state). In this process, since the bending radius decreases, the folding electronic device can be prevented from being over pulled or torn.

The folding electronic device has an unfolded state. When bent in a first direction in the unfolded state, the folding electronic device can be folded out, and when bending in a second direction in the unfolded state, the folding electronic device can be folded in. The first direction is opposite to the second direction.

The first elastic connector 700 may be elongated or shortened with meshed rotation of the first gear 300 and the second gear 400. Optionally, when the first gear 300 and the second gear 400 are driven to be meshed by rotation of the first rotating shaft 100 and the second rotating shaft 200, a distance between the first rotating shaft 100 and the second rotating shaft 200 may be changed with the change of the axis center distance between the first gear 300 and the second gear 400, to further drive the first elastic connector 700 to be elongated or shortened. That is, the first elastic connector 700 adapts to the change of the axis center distance between the first gear 300 and the second gear 400 during meshing by elastic deformation of the first elastic connector 700, thereby ensuring normal rotation and meshing.

In the folding electronic device disclosed in the embodiments of this application, by improving the structure of the electronic device in the related art, the first gear 300 and the second gear 400 are mounted on the first rotating shaft 100 and the second rotating shaft 200 respectively, the first rotating shaft 100 is rotatably connected to the second rotating shaft 200 through the first elastic connector 700, and under extension and compression of the first elastic connector 700, the axis center distance between the first rotating shaft 100 and the second rotating shaft 200 changes. In a case that the folding mechanism is in the first state, the first distal edge is meshed with the second distal edge, so that the axis center distance increases and the bending radius increases, thereby ensuring that the folding electronic device can be folded in in a case of avoiding crease and damage caused by excessive extrusion of the folding electronic device. In a case that the folding mechanism is in the second state, the first proximal edge is meshed with the second proximal edge, so that the axis center distance decreases and the bending radius decreases, thereby ensuring that the folding electronic device can be folded out without being over pulled or broken. It can be learned that, in the folding electronic device disclosed in the embodiments of this application, by adjusting the axis center distance between the first rotating shaft 100 and the second rotating shaft 200, the problem of the short service life of the flexible screen of the folding electronic device because the flexible screen is easily damaged during folding can be resolved.

In the embodiments of this application, the first rotating shaft 100 is slidably sleeved with a first occlusion structure 110, a surface of the first occlusion structure 110 facing the first gear 300 is provided with first occlusal teeth 111, an end surface of the first gear 300 facing the first occlusion structure 110 is provided with second occlusal teeth 310, and the first connecting portion 500 has a first limiting surface 510 facing the first gear 300. Optionally, one end of a first elastic mechanism 800 may be positioned on the first limiting surface 510, and the other end may be positioned on the first occlusion structure 110. The first elastic mechanism 800 in a pre-pressed state is arranged between the first occlusion structure 110 and the first limiting surface 510, the first occlusal teeth 111 are elastically meshed with the second occlusal teeth 310, and the first gear 300 is in contact with the first elastic connector 700; the first elastic mechanism 800 between the first occlusion structure 110 and the first limiting surface 510 may push the first occlusion structure 110, so that the second occlusal teeth 310 and the first occlusal teeth 111 can maintain an meshed state, thereby facilitating hovering of the first connecting portion 500, and finally implementing hovering of the folding electronic device at any angle during folding or unfolding.

The second rotating shaft 200 is slidably sleeved with a second occlusion structure 210, an end surface of a second gear 400 facing the second occlusal teeth 310 is provided with third occlusal teeth 410, an end surface of the second occlusion structure 210 facing the second gear 400 is provided with fourth occlusal teeth 311, and the second connecting portion 600 has a second limiting surface 610 facing the second gear 400. Optionally, one end of a second elastic mechanism 900 may be positioned on the second limiting surface 610, and the other end may be positioned on the second occlusion structure 210. The second elastic mechanism 900 in a pre-pressed state is arranged between the second occlusion structure 210 and the second limiting surface 610, the third occlusal teeth 410 are elastically meshed with the fourth occlusal teeth 311, and the second gear 400 is in contact with the first elastic connector 700. The second elastic mechanism 900 between the second occlusion structure 210 and the second limiting surface 610 may push the second occlusion structure 210, so that the fourth occlusal teeth 311 and the third occlusal teeth 410 can maintain an meshed state, thereby facilitating hovering of the second connecting portion 600, and finally implementing hovering of the folding electronic device at any angle during folding or unfolding.

In this case, the first elastic mechanism 800 maintains elastic meshing of the first occlusal teeth 111 and the second occlusal teeth 310, and the second elastic mechanism 900 maintains elastic meshing of the third occlusal teeth 410 and the fourth occlusal teeth 311. The first elastic mechanism 800 and the second elastic mechanism 900 can maintain the first gear 300 and the second gear 400 at any meshed position, thereby ensuring that the folding mechanism can hover at will. The structure is beneficial to generating more obvious sense of mechanical operation when the user manually controls folding or unfolding, thereby improving sense of mechanical control of the user.

In an optional solution, one of the first occlusion structure 110 and the second occlusion structure 210 may be provided with a sleeve 120, the other is provided with a sliding rod 220, and the sliding rod 220 is in sliding fit with the sleeve 120. In the process, the first occlusion structure 110 and the second occlusion structure 210 are slidably sleeved on the first rotating shaft 100 and the second rotating shaft 200 respectively, to rotate relative to the first rotating shaft 100 and the second rotating shaft 200. However, the sliding rod 220 is sleeved inside the sleeve 120, so that the first occlusion structure 110 and the second occlusion structure 210 do not rotate about axes of the first rotating shaft 100 and the second rotating shaft 200, but may reciprocate in an extension direction of the sliding rod 220, and the axis center distance between the first rotating shaft 100 and the second rotating shaft 200 changes while the sliding rod 220 slides. In this case, during folding of the folding electronic device, the axis center distance between the first rotating shaft 100 and the second rotating shaft 200 increases or decreases. In addition, the distance between the first occlusion structure 110 and the second occlusion structure 210 increases or decreases with sliding of the sliding rod 220 and the sleeve 120, and the bending radius of the folding electronic device increases or decreases, so that the folding electronic device is smoother during folding, and the distance between the first rotating shaft 100 and the second rotating shaft 200 changes more accurately during rotation, thereby improving stability of folding deformation. A sliding fit direction between the sliding rod 220 and the sleeve 120 may be perpendicular to an axial direction of the first rotating shaft 100 or the second rotating shaft 200.

In a further technical solution, the first elastic mechanism 800 may be arranged between the first limiting surface 510 and one of the sleeve 120 and the sliding rod 220, that is, one end of the first elastic mechanism 800 fits one of the sleeve 120 and the sliding rod 220, and the other end of the first elastic mechanism 800 fits the first limiting surface 510. The second elastic mechanism 900 may be arranged between the second limiting surface 610 and the other one of the sleeve 120 and the sliding rod 220, that is, one end of the second elastic mechanism 900 fits the other one of the sleeve 120 and the sliding rod 220, and the other end of the second elastic mechanism 900 fits the second limiting surface 610.

Optionally, the sleeve 120 and the sliding rod 220 may be mounted on the first occlusion structure 110 and the second occlusion structure 210 in two ways. In a case that the first occlusion structure 110 is provided with the sleeve 120 and the second occlusion structure 210 is provided with the sliding rod 220, the first elastic mechanism 800 is arranged between the sleeve 120 and the first limiting surface 510, and the second elastic mechanism 900 is arranged between the sliding rod 220 and the second limiting surface 610; and in a case that the first occlusion structure 110 is provided with the sliding rod 220 and the second occlusion structure 210 is provided with the sleeve 120, the first elastic mechanism 800 is arranged between the sliding rod 220 and the first limiting surface 510, and the second elastic mechanism 900 is arranged between the sleeve 120 and the second limiting surface 610. In this case, the sleeve 120 and the sliding rod 220 may be used to assist in mounting the first elastic mechanism 800 and the second elastic mechanism 900, thereby implementing positioning of the first elastic mechanism 800 and the second elastic mechanism 900.

In an optional solution, a screw hole may be provided on a contact part between the first limiting surface 510 and the first rotating shaft 100, threads are arranged on an outer contact surface between the first rotating shaft 100 and the first limiting surface 510, and the first rotating shaft 100 is connected to the first connecting portion 500 through screw-threaded fit. In an optional solution, a screw hole is provided at a contact part between the second limiting surface 610 and the second rotating shaft 200, and threads are arranged on an outer contact surface between the second rotating shaft 200 and the second limiting surface 610, and the second rotating shaft 200 may be connected to the second limiting surface 610 through screw-threaded fit. Certainly, the first rotating shaft 100 and the first connecting portion 500, and the second rotating shaft 200 and the second connecting portion 600 may be assembled in manners such as bonding, welding, and riveting.

To make more standard elastic deformation of the first elastic mechanism 800 and the second elastic mechanism 900, in an optional solution, the first elastic mechanism 800 may be sleeved on the first rotating shaft 100. Similarly, the second elastic mechanism 900 may be sleeved on the second rotating shaft 200. The first elastic mechanism 800 and the second elastic mechanism 900 may be springs or other components capable of elastic deformation (for example, an elastic block or an elastic sheet), and specific structures of the first elastic mechanism 800 and the second elastic mechanism 900 are not limited in the embodiments of this application.

In an optional solution, both the first elastic mechanism 800 and the second elastic mechanism 900 may be helical scaling springs.

In this case, when the user folds the folding electronic device, the deformation of the first elastic mechanism 800 is changed through a change in a meshing state of the first occlusal teeth 111 and the second occlusal teeth 310. The maintenance of the deformation of the first elastic mechanism 800 causes hovering and damping of the first rotating shaft 100. The second elastic mechanism 900 and the first elastic mechanism 800 are stretched or compressed synchronously, and the second elastic mechanism 900 is always tightly connected to the second occlusion structure 210 and the second limiting surface 610. The deformation of the second elastic mechanism 900 is changed through a change in a meshing state of the third occlusal teeth 410 and the fourth occlusal teeth 311. The maintenance of the deformation of the second elastic mechanism 900 causes hovering and damping of the second rotating shaft 200, and finally the first rotating shaft 100 and the second rotating shaft 200 synchronously hover and damp, thereby avoiding the damage to the folding electronic device caused by excessive force or sudden removal by the user.

As described above, one end of the first elastic mechanism 800 may be fixed to the first limiting surface 510, and the other end of the first elastic mechanism 800 may be fixed to the first occlusion structure 110. One end of the second elastic mechanism 900 may be fixed to the second limiting surface 610, and the other end of the second elastic mechanism 900 may be fixed to the second occlusion structure 210. Therefore, in an optional solution, the first elastic mechanism 800 may be sleeved on the first rotating shaft 100, or the second elastic mechanism 900 may be sleeved on the second rotating shaft 200. In this case, the first elastic mechanism 800, the first occlusion structure 110, and the first limiting surface 510 are all arranged on the first rotating shaft 100, and the second elastic mechanism 900, the second occlusion structure 210, and the second limiting surface 610 are all arranged on the second rotating shaft 200. This arrangement is convenient for workers to assemble and reduces labor costs. In addition, neither the first limiting surface 510 nor the second limiting surface 610 is directly and fixedly connected to other components, so that the first limiting surface 510 and the second limiting surface 610 are not fixed stably with other components, thereby prolonging the service life of the folding electronic device.

In another optional technical solution, the folding mechanism may further include a second elastic connector 1000, and a material and a manufacturing process of the second elastic connector 1000 may be the same as those of the first elastic connector 700, thereby reducing models during production and improving production efficiency. Both the first rotating shaft 100 and the second rotating shaft 200 are in sliding fit with the second elastic connector 1000, the first gear 300 and the first elastic mechanism 800 are arranged between the first elastic connector 700 and the second elastic connector 1000, and the second gear 400 and the second elastic mechanism 900 are arranged between the first elastic connector 700 and the second elastic connector 1000. That is, the first gear 300 is located on one side of the first elastic connector 700 facing the first elastic mechanism 800, and the first elastic mechanism 800 is located on one side of the second elastic connector 1000 facing the first gear 300; and the second gear 400 is located on one side of the first elastic connector 700 facing the first elastic mechanism 800, and the second elastic mechanism 900 is located on one side of the second elastic connector 1000 facing the second gear 400. In this case, both the first elastic connector 700 and the second elastic connector 1000 can adapt to a change in the distance between the first rotating shaft 100 and the second rotating shaft 200 through deformation, and the first elastic connector 700 and the second elastic connector 1000 are spaced apart, thereby improving the balance of support. In addition, the first elastic connector 700 and the second elastic connector 1000 are spaced apart, which is more beneficial to maintaining a relative angle between the first rotating shaft 100 and the second rotating shaft 200. Generally, the first rotating shaft 100 and the second rotating shaft 200 are arranged in parallel, and in this case, an angle between the first rotating shaft 100 and the second rotating shaft 200 is zero.

In an optional solution, the first elastic connector 700 and the second elastic connector 1000 are arranged at both ends of the first rotating shaft 100 and the second rotating shaft 200 respectively. When the user applies a force to the folding electronic device for folding, since both ends of the folding electronic device are arranged with elastic connectors in a folding direction, folding degrees of the both ends of the folding electronic device are the same during folding of the folding electronic device, thereby avoiding the damage of the folding electronic device caused by different folding degrees of the both ends during folding of the folding electronic device.

In the embodiments of this application, the first connecting portion 500 may be fixedly connected to the first rotating shaft 100, and the first connecting portion 500 may be provided with a first notch 530. Optionally, the first rotating shaft 100 may be fixed to an edge of a length of the first connecting portion 500, a diameter of the first rotating shaft 100 may be less than a thickness of the first connecting portion 500, the first notch 530 may be provided at the edge of the length of the first connecting portion 500, both ends of the first rotating shaft 100 are connected at two opposite edges of the first notch 530, and the two edges of the first notch 530 may be drilled to fix the first rotating shaft 100 in holes at the two edges of the first notch 530. The first rotating shaft 100 and the first notch 530 form a first accommodating space, and a part of the first gear 300 is located in the first accommodating space. Such a structure enables the first connecting portion 500 to sacrifice a partial structure of the first connecting portion 500 to form a space for accommodating at least a part of the first gear 300, so that the folding mechanism is more compact in structure and occupies less space.

The second connecting portion 600 may be fixedly connected to the second rotating shaft 200, and the second connecting portion 600 may be provided with a second notch 630. Optionally, the second rotating shaft 200 may be fixed to an edge of a length of the second connecting portion 600, a diameter of the second rotating shaft 200 may be less than a thickness of the second connecting portion 600, the second notch 630 may be provided at the edge of the length of the second connecting portion 600, both ends of the second rotating shaft 200 are connected at two opposite edges of the second notch 630, and the two edges of the second notch 630 may be drilled to fix the second rotating shaft 200 in holes of the two edges of the second notch 630. The second rotating shaft 200 and the second notch 630 form a second accommodating space, and a part of the second gear 400 is located in the second accommodating space. Such a structure enables the second connecting portion 600 to sacrifice a partial structure of the second connecting portion 600 to form a space for accommodating at least a part of the second gear 400, so that the folding mechanism is more compact in structure and occupies less space.

In this case, the first accommodating space and the second accommodating space have a relative space, and at least part of the first gear 300 and the second gear 400 may be placed in the space, thereby reducing occupation of another space inside the folding electronic device, and being beneficial to reducing a size of the whole device and reducing material loss on the premise that all functions of the folding electronic device can be implemented.

In the embodiments of this application, the first gear 300 may be a first convex gear, the second gear 400 may be a second convex gear, and the first convex gear and the second convex gear are not circular gears. During meshing of the first convex gear and the second convex gear, the distance between a rotation center of the first convex gear and a rotation center of the second convex gear changes, the first elastic connector 700 is stretched or compressed at the same time, the axis center distance between the first rotating shaft 100 and the second rotating shaft 200 also increases or decreases, and the bending radius of the folding electronic device also increases or decreases.

Certainly, the first gear 300 may be a first eccentric gear, and the second gear 400 may be a second eccentric gear. Compared with the convex gear, the eccentric gear is still a circular gear, but a rotation center of the eccentric gear is not a geometric center of the circular gear. Because the eccentric gear is still a circular gear, the eccentric gear has an advantage of simple manufacture.

Based on the folding mechanism disclosed in the embodiments of this application, an embodiment of this application discloses a folding electronic device, which may include a flexible screen 1100, a first housing, a second housing, and the folding mechanism described above.

The flexible screen 1100 may be a light-emitting diode (Light-Emitting Diode, LED) flexible display screen, which has the advantages of strong flexibility, high resolution, and low power consumption. In addition, a mounting process is simple, and the flexible screen 1100 may be mounted by methods such as magnet adsorption and bonding, which simplifies the mounting and disassembling process, is also convenient for maintenance, and greatly reduces the mounting and maintenance costs.

The first housing and the second housing may be metal housings or non-metal housings, and specific materials of the first housing and the second housing are not limited in the embodiments of this application. The first connecting portion 500 is connected to the first housing, and the second connecting portion 600 is connected to the second housing. During folding of the folding mechanism, the first housing and the second housing are rotatable relative to each other with relative rotation between the first connecting portion 500 and the second connecting portion 600, thereby driving the flexible screen 1100 of the folding electronic device to be folded or unfolded.

As described above, the first housing is connected to the first connecting portion 500, and rotatable with the first connecting portion 500, and the second housing is connected to the second connecting portion 600, and rotatable with the second connecting portion 600. The flexible screen 1100 includes a first region, a second region, and a joint region, the first region is connected to the second region through the joint region, the first region is connected to the first housing, and the second region is connected to the second housing. Optionally, the first region and the second region may be connected to surfaces of the first housing and the second housing in a bonding manner, and areas of surfaces of the first housing and the second housing bonded to the first region and the second region are the same as areas of the first region and the second region, to support the flexible screen 1100.

In a case that the first housing rotates relative to the second housing to a folded state of the folding electronic device and the flexible screen 1100 is located between the first housing and the second housing, the first distal edge is meshed with the second distal edge. Optionally, when the user does not use the folding electronic device, the flexible screen 1100 is meshed with the first gear 300 and the second gear 400 on the first rotating shaft 100 and the second rotating shaft 200, the first distal edge of the first gear 300 is meshed with the second distal edge of the second gear 400, the first elastic connector 700 and the second elastic connector 1000 are stretched, and the first elastic mechanism 800 and the second elastic mechanism 900 push the first occlusion structure 110 and the second occlusion structure 210 respectively to implement hovering and damping when the folding electronic device rotates. The axis center distance between the first rotating shaft 100 and the second rotating shaft 200 increases, and bending radiuses at the first connecting sheet and the second connecting sheet increase, so that the flexible screen 1100 of the folding electronic device is located between the first housing and the second housing, which can avoid direct contact between the flexible screen 1100 and an external environment, and avoid damage or friction of the flexible screen 1100, thereby prolonging the service life of the flexible screen 1100.

In a case that the first housing rotates relative to the second housing to a folded state of the folding electronic device and the first region and the second region are located on two opposite sides of the first housing and the second housing, the first proximal edge is meshed with the second proximal edge. Optionally, when the user uses the electronic device, the flexible screen 1100 is meshed with the first gear 300 and the second gear 400 on the first rotating shaft 100 and the second rotating shaft 200, the first proximal edge of the first gear 300 is meshed with the second proximal edge of the second gear 400, the first elastic connector 700 and the second elastic connector 1000 are compressed, and the first elastic mechanism 800 and the second elastic mechanism 900 push the first occlusion structure 110 and the second occlusion structure 210 respectively to implement hovering and damping when the folding electronic device rotates. The axis center distance between the first rotating shaft 100 and the second rotating shaft 200 decreases, so that the first region and the second region of the flexible screen 1100 of the folding electronic device are located on two opposite sides of the first housing and the second housing. Certainly, a suitable folding degree may be rotated by according to requirements of the user, so that the user can use the folding electronic device more comfortably according to preference of the user.

In a further technical solution, the first connecting portion 500 may be a first connecting sheet fixedly connected to the first housing, and the second connecting portion 600 may be a second connecting sheet fixedly connected to the second housing. In an optional solution, the first connecting sheet and the first housing, and the second connecting sheet and the second housing may be connected in manners such as bonding, welding, and riveting. Materials of the first connecting sheet and the second connecting sheet may be sheet metal materials, and specific materials of the first connecting sheet and the second connecting sheet are not limited in the embodiments of this application.

The folding and unfolding of the folding electronic device described above may be implemented through a manual operation. Certainly, the folding electronic device may further include a driving mechanism. The driving mechanism is connected to the first rotating shaft 100 or the second rotating shaft 200 to drive the first rotating shaft 100 or the second rotating shaft 200 to rotate, thereby implementing unfolding or folding of the folding mechanism. Compared with manual driving, mechanical driving is mainly reflected in that it is easier for the user when using the folding electronic device.

The folding electronic device disclosed in the embodiments of this application may be a mobile phone, a tablet computer, an e-book reader, a game console, a wearable device, or the like. A specific type of the folding electronic device is not limited in the embodiments of this application.

The foregoing embodiments of this application focus on describing differences between the embodiments. As long as different optimization features of the embodiments are not contradictory, the embodiments can be combined to form a better embodiment, and details are not described herein for the brevity of the text.

The foregoing descriptions are merely embodiments of this application, and are not intended to limit this application. For a person skilled in the art, various modifications and variations may be made to this application. Any modification, equivalent replacement, or improvement made without departing from the spirit and principle of this application shall fall within the scope of the claims of this application.

What is claimed is:

1. A folding mechanism, applied to a folding electronic device, comprising a first rotating shaft, a second rotating shaft, a first gear, a second gear, a first connecting portion, a second connecting portion, and a first elastic connector, wherein the first connecting portion is connected to the first rotating shaft, the second connecting portion is connected to the second rotating shaft, both the first rotating shaft and the second rotating shaft are rotatably connected to the first elastic connector, the first gear is mounted on the first rotating shaft, the second gear is mounted on the second rotating shaft, the first gear is meshed with the second gear, the first gear has a first distal edge and a first proximal edge, the second gear has a second distal edge and a second proximal edge, the first elastic connector is configured to be elongated or shortened with meshed rotation of the first gear and the second gear, the folding mechanism has a first folding state in which the first distal edge is meshed with the second distal edge, and a second folding state in which the first proximal edge is meshed with the second proximal edge.

2. The folding mechanism according to claim 1, wherein the first rotating shaft is slidably sleeved with a first occlusion structure, a surface of the first occlusion structure facing the first gear is provided with first occlusal teeth, an end surface of the first gear facing the first occlusion structure is provided with second occlusal teeth, the first connecting portion has a first limiting surface facing the first gear, a first elastic mechanism in a pre-pressed state is arranged between the first occlusion structure and the first limiting surface, the first occlusal teeth are elastically meshed with the second occlusal teeth, and the first gear is in contact with the first elastic connector; and/or the second rotating shaft is slidably sleeved with a second occlusion structure, an end surface of the second gear facing the second occlusal teeth is provided with third occlusal teeth, an end surface of the second occlusion structure facing the second gear is provided with fourth occlusal teeth, the second connecting portion has a second limiting surface facing the second gear, a second elastic mechanism in a pre-pressed state is arranged between the second occlusion structure and the second limiting surface, the third occlusal teeth are elastically meshed with the fourth occlusal teeth, and the second gear is in contact with the first elastic connector.

3. The folding mechanism according to claim 2, wherein one of the first occlusion structure and the second occlusion structure is provided with a sleeve, the other is provided with a sliding rod, and the sliding rod is in sliding fit with the sleeve.

4. The folding mechanism according to claim 3, wherein in a case that the first occlusion structure is provided with the sleeve and the second occlusion structure is provided with the sliding rod, the first elastic mechanism is arranged between the sleeve and the first limiting surface, and the second elastic mechanism is arranged between the sliding rod and the second limiting surface; and in a case that the first occlusion structure is provided with the sliding rod and the second occlusion structure is provided with the sleeve, the first elastic mechanism is arranged between the sliding rod and the first limiting surface, and the second elastic mechanism is arranged between the sleeve and the second limiting surface.

5. The folding mechanism according to claim 2, wherein the first elastic mechanism is sleeved on the first rotating shaft, or the second elastic mechanism is sleeved on the second rotating shaft.

6. The folding mechanism according to claim 2, wherein the folding mechanism further comprises a second elastic connector, both the first rotating shaft and the second rotating shaft are in sliding fit with the second elastic connector, the first gear and the first elastic mechanism are arranged between the first elastic connector and the second elastic connector, and the second gear and the second elastic mechanism are arranged between the first elastic connector and the second elastic connector.

7. The folding mechanism according to claim 1, wherein the first connecting portion is fixedly connected to the first rotating shaft, the first connecting portion is provided with a first notch, both ends of the first rotating shaft are connected to two opposite edges of the first notch, the first rotating shaft and the first notch form a first accommodating space, and a part of the first gear is located in the first accommodating space; and/or the second connecting portion is fixedly connected to the second rotating shaft, the second connecting portion is provided with a second notch, both ends of the second rotating shaft are connected to two opposite edges of the second notch, the second rotating shaft and the second notch form a second accommodating space, and a part of the second gear is located in the second accommodating space.

8. The folding mechanism according to claim 1, wherein the first gear is a first convex gear and the second gear is a second convex gear; or the first gear is a first eccentric gear and the second gear is a second eccentric gear.

9. A folding electronic device, comprising a flexible screen, a first housing, a second housing, and a folding mechanism, wherein the folding mechanism comprises a first rotating shaft, a second rotating shaft, a first gear, a second gear, a first connecting portion, a second connecting portion, and a first elastic connector, the first connecting portion is connected to the first rotating shaft, the second connecting portion is connected to the second rotating shaft, both the first rotating shaft and the second rotating shaft are rotatably connected to the first elastic connector, the first gear is mounted on the first rotating shaft, the second gear is mounted on the second rotating shaft, the first gear is meshed with the second gear, the first gear has a first distal edge and a first proximal edge, the second gear has a second distal edge and a second proximal edge, the first elastic connector is configured to be elongated or shortened with meshed rotation of the first gear and the second gear, the folding mechanism has a first folding state in which the first distal edge is meshed with the second distal edge, and a second folding state in which the first proximal edge is meshed with the second proximal edge;

the first housing is connected to the first connecting portion and is rotatable with the first connecting portion, and the second housing is connected to the second connecting portion and is rotatable with the second connecting portion;

the flexible screen comprises a first region, a second region, and a joint region, the first region is connected to the second region through the joint region, the first region is connected to the first housing, and the second region is connected to the second housing;

in a case that the first housing rotates relative to the second housing to a folded state of the electronic device, and the flexible screen is located between the first housing and the second housing, the first distal edge is meshed with the second distal edge; and in a case that the first housing rotates relative to the second housing to the folded state of the electronic device, and the first region and the second region are located on two opposite sides of the first housing and the second housing, the first proximal edge is meshed with the second proximal edge.

10. The folding electronic device according to claim 9, wherein the first connecting portion is a first connecting sheet fixedly connected to the first housing, and the second connecting portion is a second connecting sheet fixedly connected to the second housing.

11. The folding electronic device according to claim 9, wherein the first rotating shaft is slidably sleeved with a first occlusion structure, a surface of the first occlusion structure facing the first gear is provided with first occlusal teeth, an end surface of the first gear facing the first occlusion structure is provided with second occlusal teeth, the first connecting portion has a first limiting surface facing the first gear, a first elastic mechanism in a pre-pressed state is arranged between the first occlusion structure and the first limiting surface, the first occlusal teeth are elastically meshed with the second occlusal teeth, and the first gear is in contact with the first elastic connector; and/or the second rotating shaft is slidably sleeved with a second occlusion structure, an end surface of the second gear facing the second occlusal teeth is provided with third occlusal teeth, an end surface of the second occlusion structure facing the second gear is provided with fourth occlusal teeth, the second connecting portion has a second limiting surface facing the second gear, a second elastic mechanism in a pre-pressed state is arranged between the second occlusion structure and the second limiting surface, the third occlusal teeth are elastically meshed with the fourth occlusal teeth, and the second gear is in contact with the first elastic connector.

12. The folding electronic device according to claim 11, wherein one of the first occlusion structure and the second occlusion structure is provided with a sleeve, the other is provided with a sliding rod, and the sliding rod is in sliding fit with the sleeve.

13. The folding electronic device according to claim 12, wherein in a case that the first occlusion structure is provided with the sleeve and the second occlusion structure is provided with the sliding rod, the first elastic mechanism is arranged between the sleeve and the first limiting surface, and the second elastic mechanism is arranged between the sliding rod and the second limiting surface; and in a case that the first occlusion structure is provided with the sliding rod and the second occlusion structure is provided with the sleeve, the first elastic mechanism is arranged between the sliding rod and the first limiting surface, and the second elastic mechanism is arranged between the sleeve and the second limiting surface.

14. The folding electronic device according to claim 11, wherein the first elastic mechanism is sleeved on the first rotating shaft, or the second elastic mechanism is sleeved on the second rotating shaft.

15. The folding electronic device according to claim 11, wherein the folding mechanism further comprises a second elastic connector, both the first rotating shaft and the second rotating shaft are in sliding fit with the second elastic connector, the first gear and the first elastic mechanism are arranged between the first elastic connector and the second elastic connector, and the second gear and the second elastic mechanism are arranged between the first elastic connector and the second elastic connector.

16. The folding electronic device according to claim 9, wherein the first connecting portion is fixedly connected to the first rotating shaft, the first connecting portion is provided with a first notch, both of the first rotating shaft are connected to two opposite edges of the first notch, the first rotating shaft and the first notch form a first accommodating space, and a part of the first gear is located in the first accommodating space; and/or the second connecting portion is fixedly connected to the second rotating shaft, the second connecting portion is provided with a second notch, both ends of the second rotating shaft are connected to two opposite edges of the second notch, the second rotating shaft and the second notch form a second accommodating space, and a part of the second gear is located in the second accommodating space.

17. The folding electronic device according to claim 9, wherein the first gear is a first convex gear and the second gear is a second convex gear; or the first gear is a first eccentric gear and the second gear is a second eccentric gear.

* * * * *